(12) United States Patent
Jung (10) Patent No.: US 9,735,877 B2
(45) Date of Patent: Aug. 15, 2017

(54) OPTICAL COMMUNICATION DEVICE USING AC LED LIGHTING AND COMMUNICATION METHOD USING THE SAME

(71) Applicant: Seoul Semiconductor Co., Ltd., Ansan-si (KR)

(72) Inventor: Hye Man Jung, Ansan-si (KR)

(73) Assignee: Seoul Semiconductor Co., Ltd., Ansan-si (KR)

( * ) Notice: Subject to any disclaimer, the term of this patent is extended or adjusted under 35 U.S.C. 154(b) by 32 days.

(21) Appl. No.: 14/646,622

(22) PCT Filed: Nov. 21, 2013

(86) PCT No.: PCT/KR2013/010607
§ 371 (c)(1),
(2) Date: May 21, 2015

(87) PCT Pub. No.: WO2014/081210
PCT Pub. Date: May 30, 2014

(65) Prior Publication Data
US 2015/0288453 A1    Oct. 8, 2015

(30) Foreign Application Priority Data

Nov. 22, 2012 (KR) .................. 10-2012-0133159

(51) Int. Cl.
*H04B 10/50* (2013.01)
*H04B 10/80* (2013.01)
(Continued)

(52) U.S. Cl.
CPC ......... *H04B 10/502* (2013.01); *H04B 10/116* (2013.01); *H04B 10/27* (2013.01); *H04B 10/80* (2013.01); *H05B 41/39* (2013.01)

(58) Field of Classification Search
CPC ..... H04B 10/502; H04B 10/11–10/116; H04B 10/27; H04B 10/80; H05B 33/0815; H05B 33/0845; H05B 39/09; H05B 41/39
See application file for complete search history.

(56) References Cited

U.S. PATENT DOCUMENTS

| 2002/0008525 A1 | 1/2002 | Seagraves et al. |
| 2002/0085258 A1 | 7/2002 | Tokita et al. |
| (Continued) | | |

OTHER PUBLICATIONS

International Search Report issued Feb. 27, 2014 in International Application No. PCT/KR2013/010607.

*Primary Examiner* — David Payne
*Assistant Examiner* — Casey Kretzer
(74) *Attorney, Agent, or Firm* — H.C. Park & Associates, PLC (57) ABSTRACT

An optical communication device including a plurality of groups of light emitting diode (LED) groups that are turn on according to a control of a lighting and communication control module. The lighting and communication control module is configured to receive an AC input voltage, generate a rectified voltage from the AC input voltage, determine a voltage level of the rectified voltage, sequentially drive the plurality of LED groups according to the voltage level of the rectified voltage, and perform optical communication through the plurality of LED groups only when the voltage level of the rectified voltage is greater than or equal to a preset threshold voltage level.

15 Claims, 5 Drawing Sheets

(51) Int. Cl.
*H04B 10/27* (2013.01)
*H04B 10/116* (2013.01)
*H05B 41/39* (2006.01)

(56) References Cited

U.S. PATENT DOCUMENTS

| | | | |
|---|---|---|---|
| 2006/0061302 A1 | 3/2006 | Kato et al. | |
| 2010/0013396 A1* | 1/2010 | Peng | H05B 37/0263 315/192 |
| 2010/0049454 A1 | 2/2010 | Irissou et al. | |
| 2010/0054748 A1 | 3/2010 | Sato | |
| 2010/0109537 A1* | 5/2010 | Nishino | H05B 33/0827 315/185 R |
| 2010/0194298 A1* | 8/2010 | Kuwabara | H05B 33/083 315/186 |
| 2012/0051757 A1 | 3/2012 | Nishino et al. | |
| 2013/0278160 A1* | 10/2013 | Wu | H05B 33/0845 315/200 R |

* cited by examiner

OPTICAL COMMUNICATION DEVICE USING AC LED LIGHTING AND COMMUNICATION METHOD USING THE SAME

CROSS-REFERENCE TO RELATED APPLICATIONS

This application is the National Stage Entry of International Application No. PCT/KR2013/010607, filed on Nov. 21, 2013, and claims priority from and the benefit of Korean Patent Application No. 10-2012-0133159, filed on Nov. 22, 2012, both of which are incorporated herein by reference for all purposes as if fully set forth herein.

BACKGROUND

Field

The present invention relates to an optical communication device using alternating current (AC) light emitting diode (LED) lighting and a communication method using the same, and more particularly, to an optical communication device using AC LED lighting configured to perform optical communication only in a section in which a voltage level of a rectified voltage is a preset voltage level or more in a sequential driving AC LED lighting device, and a communication method using the same.

Discussion of the Background

In an optical communication circuit using an alternating current (AC) according to the related art, in order to detect a zero point of an AC voltage, a zero-crossing detector has been essentially required. In addition, since brightness of light is not constant so as to correspond to magnitude of a power period voltage on characteristics of AC LED driving, there is a problem that it is difficult to detect and determine an optical signal where a predetermined distance or more is spaced apart from a light source.

Meanwhile, an optical communication circuit using a direct current (DC) according to the related art has an advantage that it may easily implement optical communication as compared to an optical communication circuit using the AC, but has a disadvantage in that a converter circuit for LED driving makes a system complex. In addition, there is a disadvantage that loss of a switching circuit in the converter is increased upon initiating the optical communication, which causes an increase in circuit loss

SUMMARY

The present invention is to solve the problems of the related art as described above.

An object of the present invention is to provide an optical communication device using AC LED lighting capable of performing optical communication only in a section in which a voltage level of a rectified voltage is a preset voltage level or more in a sequential driving AC LED lighting device, and a communication method using the same.

Another object of the present invention is to provide an optical communication device using AC LED lighting capable of performing optical communication without detecting a zero point of an AC voltage, and a communication method using the same.

A characteristic configuration of the present invention for accomplishing the objects of the present invention as described above and unique effects of the present invention to be described below will be described below.

According to an aspect of the present invention, there is provided an optical communication device using alternating current (AC) light emitting diode (LED) lighting that receives an AC input voltage to sequentially drive a plurality of LED groups, including: the plurality of LED groups which are turned on according to a control of a lighting and communication control module; and the lighting and communication control module receiving the AC input voltage to generate a rectified voltage, determining a voltage level of the rectified voltage, sequentially driving the plurality of LED groups according to the voltage level of the rectified voltage, and performing optical communication through the plurality of LED groups only if the voltage level of the rectified voltage is a preset threshold voltage level or more.

The lighting and communication control module may include: a signal inputting unit receiving the AC input voltage; a rectifying unit rectifying the AC input voltage to generate the rectified voltage; a plurality of LED group driving units receiving the rectified voltage to provide an individual LED driving signal to each of the plurality of LED groups; an LED driving controlling unit controlling the LED group driving units according to magnitude of the rectified voltage to determine magnitude of the LED driving signal provided to the plurality of LED groups and a provision timing and blocking timing of the LED driving signal; a plurality of LED driving signal outputting units individually providing the LED driving signal of the LED group driving unit to each of the LED groups; and a transmission controlling unit receiving the rectified voltage to determine magnitude of a voltage level thereof and controlling a turn on of the plurality of LED groups in a case in which the voltage level of the rectified voltage is the preset threshold voltage level or more to transmit data.

The threshold voltage level may be a forward voltage level at which more than half of the plurality of LED groups are turned on.

The threshold voltage level may be a forward voltage level at which more than ⅔ of the plurality of LED groups are turned on.

The threshold voltage level may be a forward voltage level at which all of the plurality of LED groups are turned on.

The transmission controlling unit may include a data memory means in which the data is stored, and the optical communication device using the AC LED lighting may further include data input and output ports connected to an external device, reading out the data stored in the data memory means to output the read data to the external device, and outputting data input from the external device to the data memory means.

The transmission controlling unit may include: a rectified voltage determining means receiving the rectified voltage and determining a voltage level of the received rectified voltage; a data memory means in which the data is stored; and a transmission controlling means transmitting the data by comparing the voltage level of the rectified voltage determined by the rectified voltage determining means and the threshold voltage level with each other, reading out data to be transmitted from the data memory means in a case in which the voltage level of the rectified voltage is the threshold voltage level or more, and controlling the turn on of the plurality of LED groups based on the read data.

The transmission controlling means may modulate the LED driving signal based on the read data to generate a modulated pulse signal, and the LED driving controlling unit may control a driving of the plurality of LED groups based on the modulated pulse signal.

According to another aspect of the present invention, there is provided an optical communication method using alternating current (AC) light emitting diode (LED) lighting that receives an AC input voltage to sequentially drive a plurality of LED groups, including: (a) receiving the AC input voltage to generate a rectified voltage; and (b) determining a voltage level of the rectified voltage, sequentially driving the plurality of LED groups according to the voltage level of the rectified voltage, and performing optical communication through the plurality of LED groups only if the voltage level of the rectified voltage is a preset threshold voltage level or more.

The step (b) may include: (b1) determining the voltage level of the rectified voltage; (b2) sequentially driving the plurality of LED groups according to the determined voltage level of the rectified voltage; and (b3) comparing the determined voltage level of the rectified voltage and the preset threshold voltage level with each other, initiating the optical communication by controlling a turn on of the plurality of LED groups in a case in which the voltage level of the rectified voltage is increased to the threshold voltage level or more, and terminating the optical communication in a case in which the voltage level of the rectified voltage is decreased below the threshold voltage level.

The threshold voltage level may be a forward voltage level at which more than half of the plurality of LED groups are turned on.

The threshold voltage level may be a forward voltage level at which more than ⅔ of the plurality of LED groups are turned on.

The threshold voltage level may be a forward voltage level at which all of the plurality of LED groups are turned on.

The step (b3) may include: (b3-1) determining whether or not the voltage level of the rectified voltage is increased to the threshold voltage level or more, or is decreased below the threshold voltage level by comparing the determined voltage level of the rectified voltage and the preset threshold voltage level with each other; (b3-2) initiating the optical communication by controlling the turn on of the plurality of LED groups in the case in which it is determined that the voltage level of the rectified voltage is increased to the threshold voltage level or more; and (b3-3) terminating the optical communication in the case in which the voltage level of the rectified voltage is decreased below the threshold voltage level.

In the step (b3-2), data to be transmitted may be read out from a data memory and the turn on of the plurality of LED groups may be controlled based on the read data to transmit the data.

In the step (b3-2), a LED driving signal may be modulated based on the read data to generate a modulated pulse signal and a driving of the plurality of LED groups may be controlled based on the modulated pulse signal.

According to the exemplary embodiments of the present invention, since the present invention is configured to perform optical communication only in the section in which the voltage level of the rectified voltage is the preset voltage level or more in the sequential driving AC LED lighting device, stable optical communication may be performed.

In addition, according to the present invention, since optical communication may be performed without a separate zero-crossing detector, the circuit may be easily designed and manufacturing costs may be reduced.

DETAILED DESCRIPTION OF THE ILLUSTRATED EMBODIMENTS

The present invention will be described below in detail with reference to the accompanying drawings showing specific exemplary embodiments in which the present invention may be practiced. These exemplary embodiments will be described in detail for those skilled in the art in order to practice the present invention. It should be appreciated that various exemplary embodiments of the present invention are different but do not have to be exclusive. For example, specific shapes, configurations, and characteristics described in an exemplary embodiment of the present invention may be implemented in another exemplary embodiment without departing from the spirit and the scope of the present invention. In addition, it should be understood that positions or arrangements of individual components in each disclosed exemplary embodiment may be changed without departing from the spirit and the scope of the present invention. Therefore, a detailed description described below should not be construed as being restrictive and the scope of the present invention is defined only by the accompanying claims and their equivalents if appropriate. Similar reference numerals will be used to describe the same or similar functions throughout the accompanying drawings.

Hereinafter, exemplary embodiments of the present invention will be described in detail with reference to the accompanying drawings so that those skilled in the art may easily implement the present invention.

Exemplary Embodiment of the Present Invention

According to an exemplary embodiment of the present invention, a term "LED group" refers to a collection of LEDs in which a plurality of LEDs (or a plurality of light emitting cells) are connected in series with/in parallel to/in series with and in parallel to each other, so that an operation thereof is controlled (i.e., simultaneously turned on/off) as a single unit according to a control of an AC LED driving and optical communication control module.

In addition, a term 'first forward voltage level Vf1' refers to a threshold voltage capable of driving a first LED group, a term 'second forward voltage level Vf2' refers to a threshold voltage capable of driving the first LED group and a second LED group which are connected in series with each other, and a term 'third forward voltage level Vf3' refers to a threshold voltage capable of driving first to third LED groups which are connected in series with each other. That is, a term 'n-th forward voltage level Vfn' refers to a threshold voltage capable of driving first to n-th LED groups which are connected in series with each other.

In addition, a term 'AC LED driving and optical communication control module' refers to a module receiving an AC voltage so as to drive and control an LED, and the present specification provides a description based on an exemplary embodiment controlling the driving of the LED using a rectified voltage, but is not limited thereto and should be interpreted comprehensively and widely.

In addition, a term 'sequential driving mode' refers to a driving mode of sequentially turning on a plurality of LED groups according to an increase in a received input voltage and sequentially turning off the plurality of LED groups according to a decrease in the received input voltage, in an LED driving module driving the LED by receiving an input voltage having magnitude which is varied over time.

In addition, terms such as V1, V2, V3, . . . , t1, t2, . . . , T1, T2, T3, and the like used for expressing any certain voltages, certain timings, certain temperatures, and the like in the present specification are not used to express absolute values, but used to be distinguishable from each other.

Figure 4:
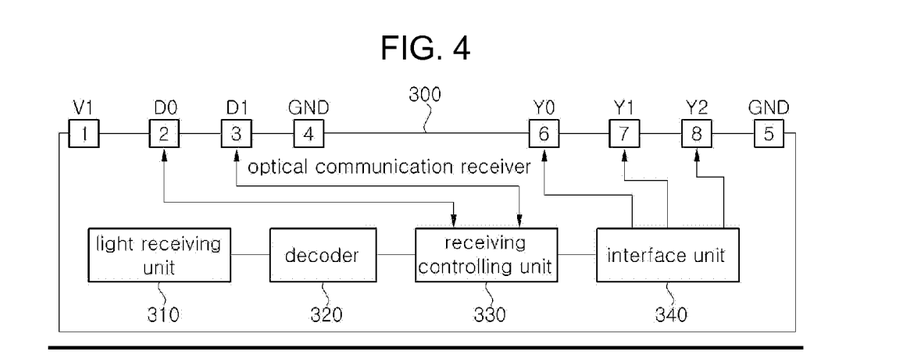
FIG. 4 is a configuration block diagram of an optical communication receiver according to an exemplary embodiment of the present invention.

FIG. 4 is a configuration block diagram of an optical communication receiver according to an exemplary embodiment of the present invention.

Figure 5:
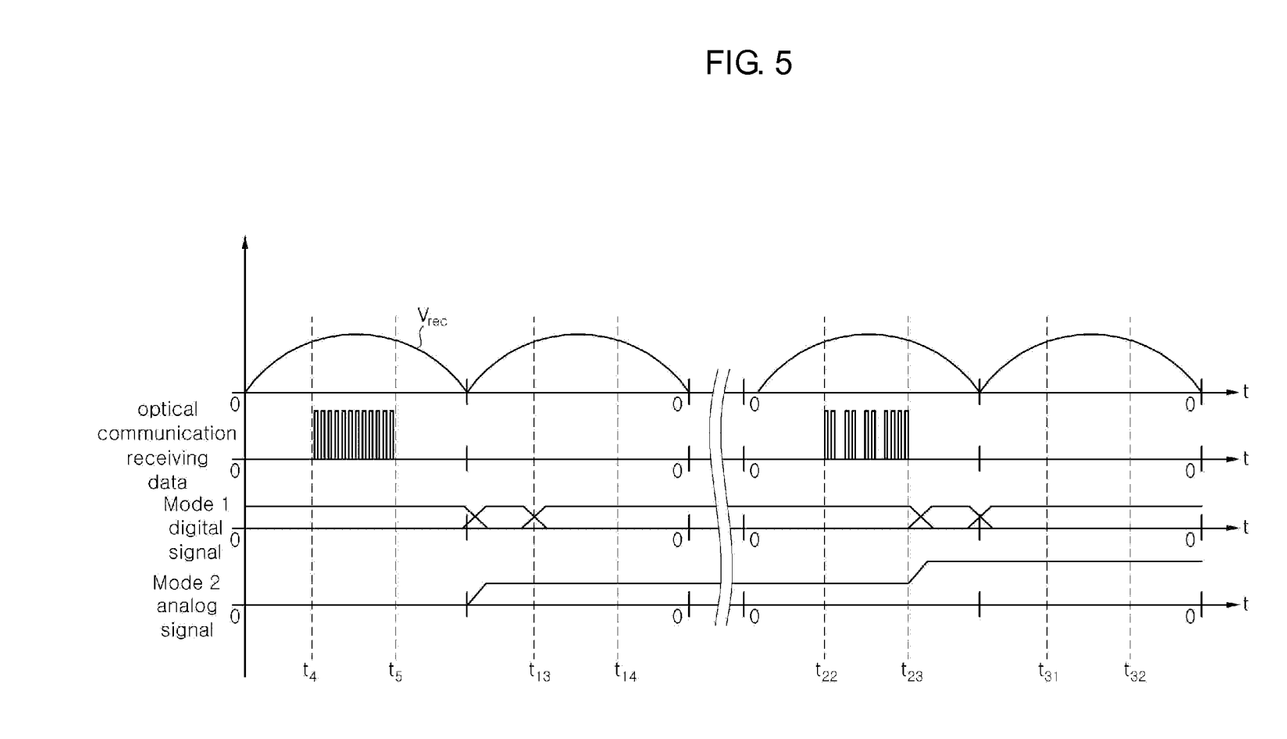
FIG. 5 is a timing diagram illustrating a process of the optical communication receiver according to an exemplary embodiment of the present invention.

FIG. 5 is a timing diagram illustrating a process of the optical communication receiver according to an exemplary embodiment of the present invention.

Figure 6:
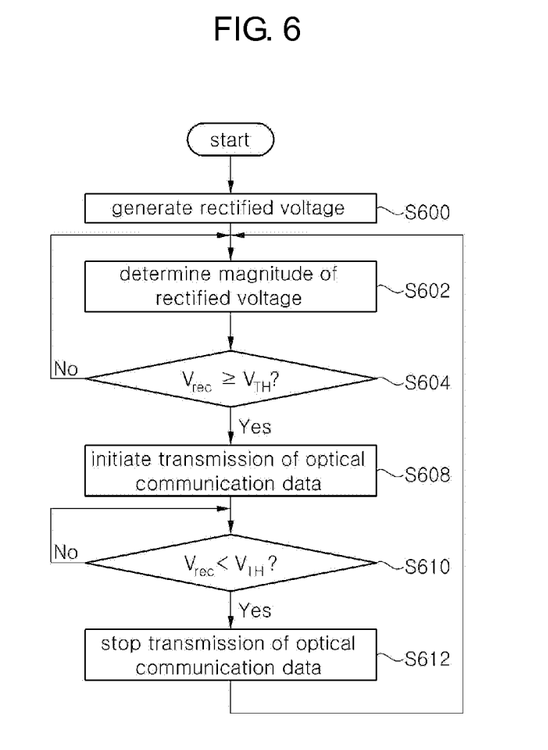
FIG. 6 is a flow chart illustrating an optical communication transmission process performed in the optical communication device using AC LED lighting according to an exemplary embodiment of the present invention.

FIG. 6 is a flow chart illustrating an optical communication transmission process performed in the optical communication device using AC LED lighting according to an exemplary embodiment of the present invention.

Overview of LED Lighting Device

Figure 1:
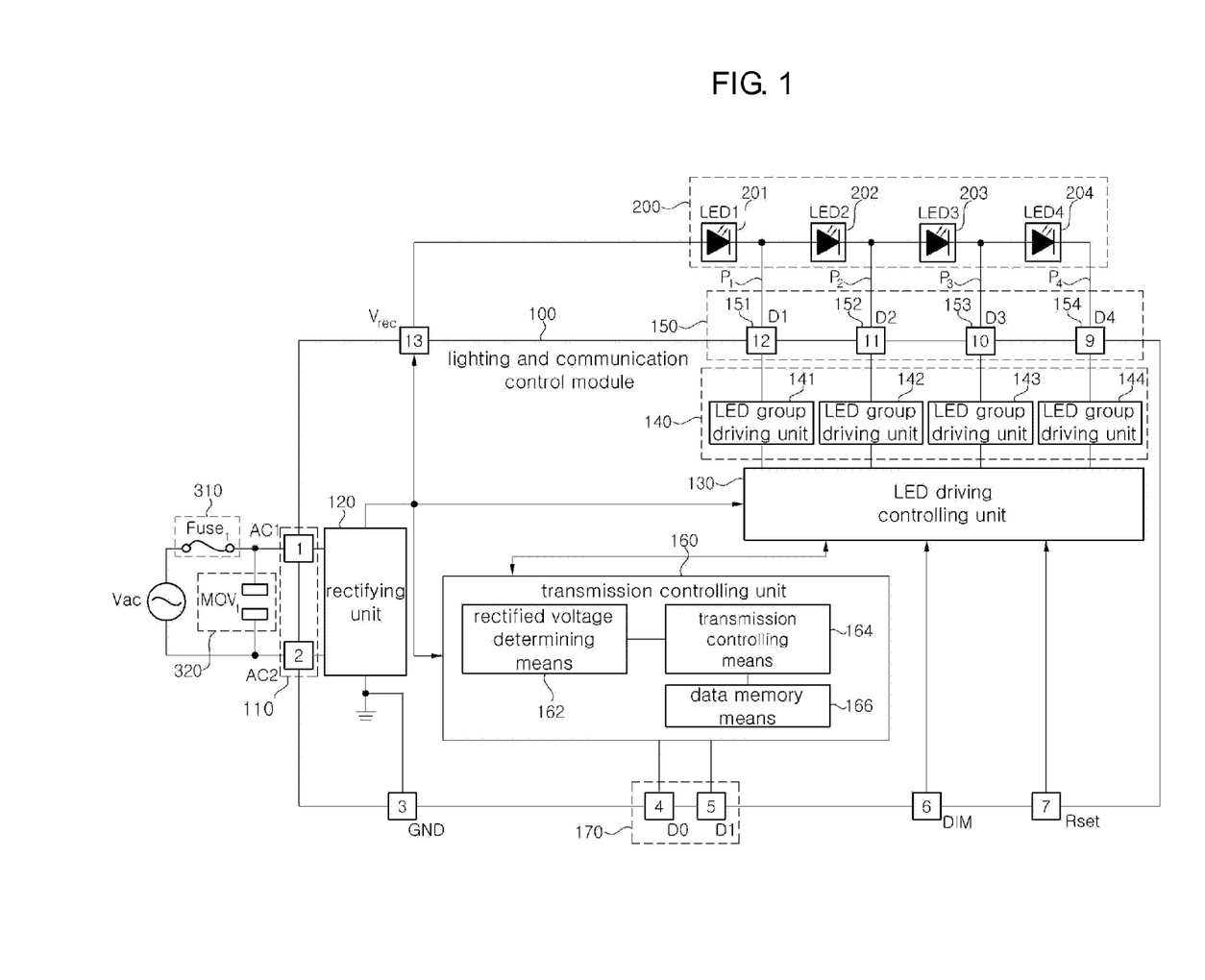
FIG. 1 is a schematic configuration block diagram of an optical communication device using AC LED lighting according to an exemplary embodiment of the present invention.

FIG. 1 is a schematic configuration block diagram of an optical communication device using AC LED lighting according to an exemplary embodiment of the present invention. Hereinafter, the optical communication device using AC LED lighting according to an exemplary embodiment of the present invention will be schematically described with reference to FIG. 1.

As shown in FIG. 1, the optical communication device using AC LED lighting according to the present invention may include an AC LED driving and optical communication control module 100 and a plurality of LED groups 200.

The AC LED driving and optical communication control module 100 according to the present invention receives an alternating current voltage VAC from an alternating current voltage source and rectifies the received alternating current voltage so as to generate a rectified voltage $V_{rec}$. In addition the AC LED driving and optical communication control module 100 is configured to perform optical communication by initiating optical communication in a case in which the rectified voltage $V_{rec}$ is increased to a preset threshold voltage level or more and stopping optical communication in a case in which the rectified voltage $V_{rec}$ is decreased below the preset threshold voltage level while controlling a driving of a plurality of connected LED groups 200 using the generated rectified voltage $V_{rec}$.

In order to perform the function as described above, the AC LED driving and optical communication control module 100 according to the present invention may include a signal inputting unit 110, a rectifying unit 120, an LED driving controlling unit 130, a plurality of LED group driving units 140, a plurality of LED driving signal outputting units 150, and a transmission controlling unit 160.

The signal inputting unit 110 is configured to receive the alternating current voltage VAC from the alternating current voltage source and output the alternating current voltage VAC to the rectifying unit 120, and the rectifying unit 120 is configured to rectify the alternating current voltage so as to generate the rectified voltage $V_{rec}$.

Figure 2:
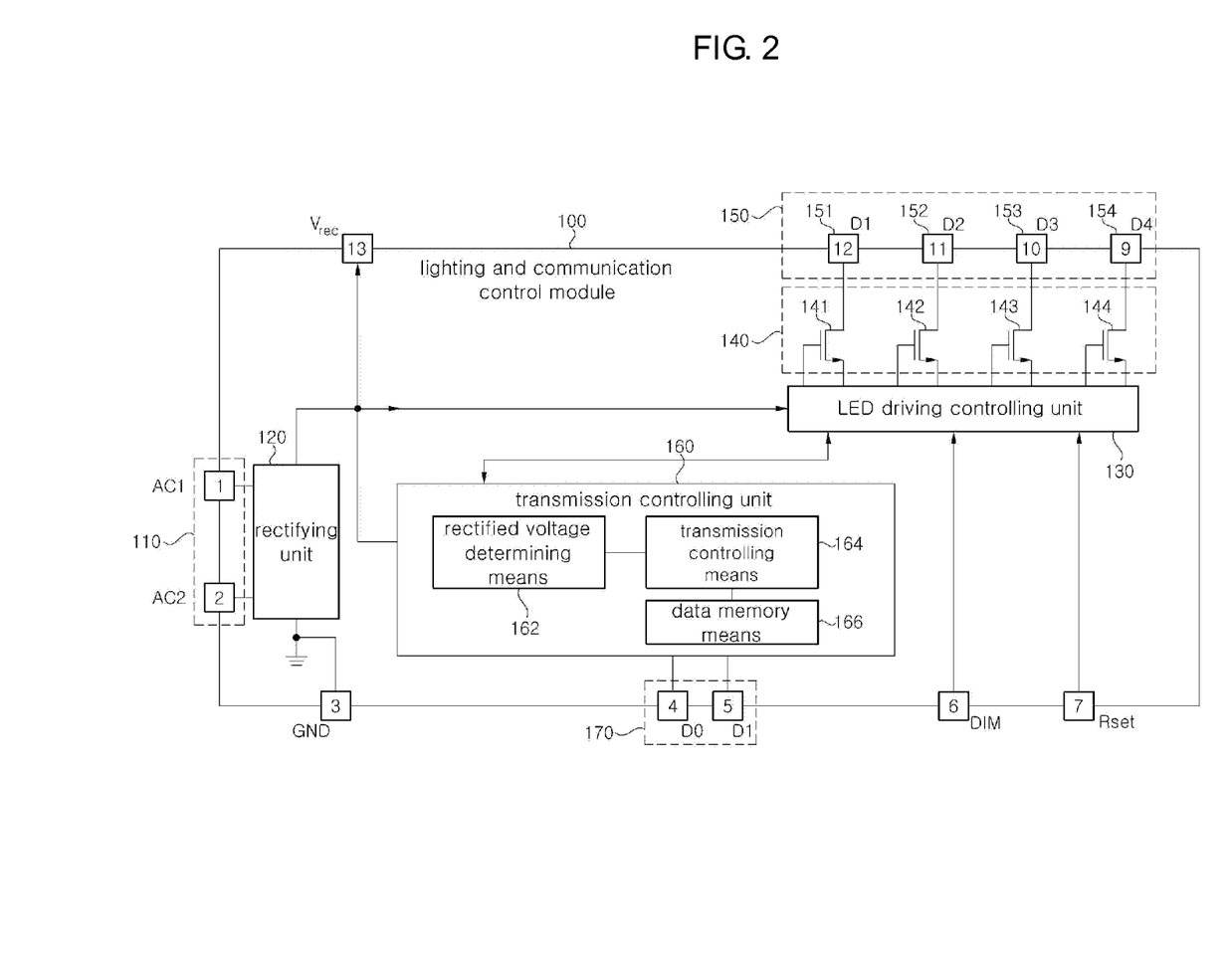
FIG. 2 is a configuration block diagram of the optical communication device using AC LED lighting according to an exemplary embodiment of the present invention.
Figure 3:
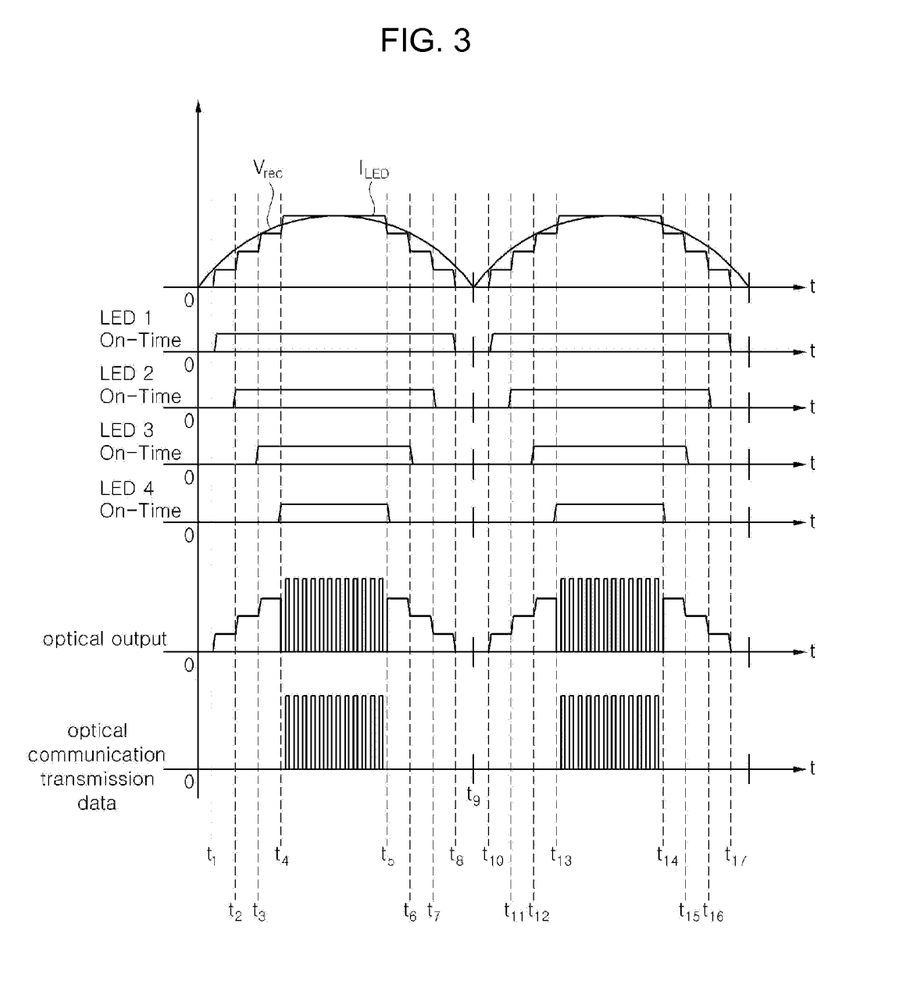
FIG. 3 is a timing diagram illustrating a transmission process of the optical communication device using AC LED lighting according to an exemplary embodiment of the present invention.

Meanwhile, the LED driving controlling unit 130, the plurality of LED group driving units 140, and the plurality of LED driving signal outputting units 150 in the AC LED driving and optical communication control module 100 according to the present invention are configured to perform a function of controlling the driving of the plurality of connected LED groups 200 using the rectified voltage $V_{rec}$. More specifically, the plurality of LED group driving units 140 are configured to perform a function of receiving the rectified voltage $V_{rec}$ described above and providing an individual LED driving signal to each of the plurality of LED groups 200. In addition, the LED driving controlling unit 130 is configured to perform a function of controlling the LED group driving units 140 depending on magnitude of the rectified voltage $V_{rec}$ to determine amplitude of the LED driving signal provided to the plurality of LED groups 200, and a providing timing and a blocking timing of the LED driving signal. In addition, the plurality of LED driving signal outputting units 150 are configured to individually provide the LED driving signal provided by the LED group driving units 140 to each of the LED groups 200. More preferably, the number of plurality of LED group driving units 140 and plurality of LED driving signal outputting units 150 according to the present invention is determined so as to correspond to the number of plurality of LED groups 200 which are subject to the control. According to the exemplary embodiment shown in FIG. 1, since the plurality of LED groups 200 include four LED groups 201, 202, 203, and 204, the plurality of LED group driving units 140 include four LED group driving units 141, 142, 143, and 144 accordingly, and similarly, the plurality of LED driving signal outputting units 150 are also configured to include four LED driving signal outputting units 151, 152, 153, and 154.

Therefore, the LED driving controlling unit 130 determines the amplitudes of the LED driving signals provided to the first LED group 201 to fourth LED group 204, the providing timing and blocking timing of the LED driving signal, depending on the magnitude of the rectified voltage $V_{rec}$, and controls the first LED group driving unit 141 to provide or block the LED driving signal to the first LED group 201 through the first LED driving signal outputting unit 151, thereby controlling the driving of the first LED group 201. Further, in a similar way, the LED driving controlling unit 130 controls the second LED group driving unit 142 to the fourth LED group driving unit 144 to control the driving of the second LED group 202 to the fourth LED group 204. As described above, detailed configurations and functions of the LED driving controlling unit 130, the plurality of LED group driving units 140, and the plurality of LED driving signal outputting units 150 will be described below with reference to FIGS. 2 and 3.

On the other hand, the transmission controlling unit 160 included in the AC LED driving and optical communication control module 100 according to the present invention is configured to control the LED driving controlling unit 130, the plurality of LED group driving units 140, the plurality of LED driving signal outputting units 150, and the plurality of LED groups 200 to perform an optical communication (particularly, data transmission using optical communication) function under a predetermined condition. More specifically, the transmission controlling unit according to the present invention is configured to determine the magnitude of the rectified voltage $V_{rec}$ input from the rectifying unit 120 and perform optical communication by initiating data transmission by controlling an emitting (turning on or off) of the plurality of LED groups 200 in a case in which the magnitude of the rectified voltage is increased to the preset threshold voltage level or more and stopping the data transmission in a case in which the magnitude of the rectified voltage is decreased below the preset threshold voltage level. A detailed configuration and function of the transmission controlling unit 160 will be described below with reference to FIGS. 2 and 3.

Configuration and Function of AC LED Driving and Optical Communication Control Module FIG. 2 is a configuration block diagram of the optical communication device using AC LED lighting according to an exemplary embodiment of the present invention and FIG. 3 is a timing diagram illustrating a transmission process of the optical communication device using AC LED lighting according to an exemplary embodiment of the present invention. Hereinafter, a configuration and function of the optical communication device using AC LED lighting according to an exemplary embodiment of the present invention will be described with reference to FIGS. 2 and 3.

As shown in FIG. 2, an optical communication device to which the AC LED driving and optical communication control module 100 according to the present invention is applied may include the AC LED driving and optical communication control module 100 and the plurality of LED groups 200 (not shown).

As shown in FIG. 2, the AC LED driving and optical communication control module 100 according to the present invention may include the signal inputting unit 110, the rectifying unit 120, the LED driving controlling unit 130, the plurality of LED group driving units 140, the plurality of LED driving signal outputting units 150, the transmission controlling unit 160, and a data inputting and outputting unit 170.

The rectifying unit 120 according to the present invention is configured to rectify the alternating current voltage VAC received through the signal inputting unit 110 to generate and output the rectified voltage $V_{rec}$. As the rectifying unit 120 described above, one of the various known rectifying circuits such as a full-wave rectifying circuit, a half-wave rectifying circuit, and the like may be used. The rectified voltage $V_{rec}$ output from the rectifying unit 120 is input to the plurality of LED groups 200 (not shown), the LED driving units 130, and the transmission controlling unit 150.

Hereinafter, the description will be provided based on the exemplary embodiment configured to include the four LED groups 201, 202, 203, and 204, the four LED group driving units 141, 142, 143, and 144, and the four LED driving signal outputting units 151, 152, 153, and 154, but it will be apparent to those skilled in the art that the present invention is not limited thereto.

As shown in FIG. 2, the AC LED driving and optical communication control module 100 may include the plurality of LED group driving units 141, 142, 143, and 144, the LED driving controlling unit 130, and the plurality of LED driving signal outputting units 151, 152, 153, and 154, in order to drive and control the LED groups 201, 202, 203, and 204 (not shown).

First, the LED driving controlling unit 130 is configured to determine the magnitude of the rectified voltage input from the rectifying unit 120, and determine the amplitude of the LED driving signal to be provided to each of the LED groups 201 to 204 (not shown), and the providing timing and the blocking timing of the LED driving signal, depending on the magnitude of the rectified voltage. In addition, the LED driving controlling unit 130 is configured to turn-on a corresponding LED group by providing the LED driving signal to the corresponding LED group(s) by controlling the LED group driving units 141 to 144 at the determined providing timing of the LED driving signal of each LED group and turn-off the corresponding LED group by blocking the provision of the LED driving signal to the corresponding LED group(s) by controlling the LED group driving units 141 to 144 at the determined blocking timing of the LED driving signal of each LED group.

The plurality of LED group driving units 141 to 144 correspond to the plurality of LED groups 201 to 204 one-to-one, and perform a function of providing the LED driving signal to each of the plurality of LED groups 201 to 204 or blocking the provision of the LED driving signal, depending on the control of the LED driving controlling unit 130. More specifically, in FIG. 2, the first LED group driving unit 141 is connected to the first LED group 201 through the first LED driving signal outputting unit 151, and is configured to provide the LED driving signal to the first LED group 201 or block the provision of the LED driving signal, depending on the control of the LED driving controlling unit 130. Similarly, the second LED group driving unit 142 is connected to the second LED group 202 through the second LED driving signal outputting unit 152, the third LED group driving unit 143 is connected to the third LED group 203 through the third LED driving signal outputting unit 153, and the fourth LED group driving unit 144 is connected to the fourth LED group 204 through the fourth LED driving signal outputting unit 154, to perform the provision and blocking functions of the LED driving signal to the corresponding LED group.

The LED group driving unit 140 as described above may be implemented using an electronic switching element such as a bipolar junction transistor (BJT), a field effect transistor (FET), or the like, and a kind thereof is not limited. In the case in which the LED group driving unit 140 is implemented using the electronic switching element, the LED driving controlling unit 130 controls the provision and the blocking of the LED driving signal to a specific LED group by controlling a turn-on and a turn-off of each of the LED group driving units 141 to 144 using a control signal of a pulse type.

The plurality of LED driving signal outputting units 151 to 154 are configured to be each disposed between the plurality of LED group driving units 141 to 144 and the plurality of LED groups 201 to 204 and provide the LED driving signal of a specific LED group driving unit to the corresponding LED group. FIG. 2 shows an exemplary embodiment in which the first LED driving signal outputting unit 151 providing the driving signal to the first LED group 201 is implemented as a terminal no. 12 D1 of the AC LED driving and optical communication control module 100, the second LED driving signal outputting unit 152 providing the driving signal to the second LED group 202 is implemented as a terminal no. 11 D2 of the AC LED driving and optical communication control module 100, the third LED driving signal outputting unit 153 providing the driving signal to the third LED group 203 is implemented as a terminal no. 10 D3 of the AC LED driving and optical communication control module 100, and the fourth LED driving signal outputting unit 154 providing the driving signal to the fourth LED group 204 is implemented as a terminal no. 9 D4 of the AC LED driving and optical communication control module 100.

Meanwhile, the transmission controlling unit 160 according to the present invention is configured to determine the voltage level of the rectified voltage $V_{rec}$ and perform optical communication through the plurality of LED groups 200 only if the voltage level of the rectified voltage is a preset threshold voltage level $V_{TH}$ or more to perform the optical communication. In this case, the threshold voltage level $V_{TH}$ may be set to a voltage level which is suitable for performing the optical communication within a coverage communication radius of the optical communication device. For example, the threshold voltage level $V_{TH}$ may be variously set to a voltage level at which more than half of all LED groups are turned on, a voltage level at which more than ⅔ of all LED groups are turned on, a voltage level at which all LED groups are turned on, and the like, if necessary, and is not limited to a specific voltage level. Hereinafter, the configuration and function of the optical communication device according to the present invention will be described based on an exemplary embodiment in which the first to fourth LED groups 201 to 204 are included and the threshold voltage level $V_{TH}$ is set to a fourth forward voltage level Vf4, which is a voltage level capable of driving all LED groups, for convenience of explanation and understanding.

FIG. 3 is a timing diagram illustrating a transmission process of the optical communication device using AC LED lighting according to an exemplary embodiment of the present invention. Referring to FIG. 3, a waveform of the rectified voltage $V_{rec}$ over time and an LED driving current $I_{LED}$ waveform accordingly are shown in an uppermost portion of FIG. 3. In addition, a graph indicated as LED 1 On-Time below the uppermost portion indicates an operation time of the first LED group 201, a graph indicated as LED 2 On-Time indicates an operation time of the second LED group 202, a graph indicated as LED 3 On-Time indicates an operation time of the third LED group 203, and a graph indicated as LED 4 On-Time indicates an operation time of the fourth LED group 204. In addition, a graph indicated as an optical output below the graph indicated as LED 4 On-Time indicates optical outputs of the plurality of LED groups 200 and a graph indicated as optical communication transmission data below the graph indicated as the optical output indicates data to be transmitted through the optical communication.

Hereinafter, functions of the plurality of LED group driving units 141 to 144, the LED driving controlling unit 130, the plurality of LED driving signal outputting units 151 to 154, and the transmission controlling unit 160 according to the present invention having the configuration as described above will be described in detail with reference to FIGS. 2 and 3.

First, as shown in the uppermost portion of FIG. 3, the rectified voltage $V_{rec}$ is changed between zero and $V_{rec}$ max over time. Therefore, the LED driving controlling unit 130 according to the present invention determines the magnitude of the rectified voltage $V_{rec}$, and controls the plurality of LED group driving units 141 to 144 so that the LED driving signal may be provided to only one LED group (e.g., the first LED group 201) of the four LED groups 201 to 204 in the case in which the magnitude of the input rectified voltage $V_{rec}$ is magnitude capable of driving one LED group (i.e., in the case in which the voltage level of the rectified voltage $V_{rec}$ belongs to a first forward voltage level (Vf1≤$V_{rec}$<Vf2)). Similarly, the LED driving controlling unit 130 controls the plurality of LED group driving units 141 to 144 so that the LED driving signal is provided to only two LED groups (e.g., the first LED group 201 and the second LED group 202) in a case in which the voltage level of the rectified voltage belongs to a second forward voltage level (Vf2≤$V_{rec}$<Vf3), and the LED driving signal is provided to only three LED groups (e.g., the first LED group 201, the second LED group 202, and the third LED group 203) in a case in which the voltage level of the rectified voltage belongs to a third forward voltage level (Vf3≤$V_{rec}$<Vf4). In this case, the transmission controlling unit 160 is also in a state in which it continuously determines the magnitude of the rectified voltage $V_{rec}$. However, as described above, since the threshold voltage level $V_{TH}$ is set to the fourth forward voltage level Vf4, the transmission controlling unit 160 does not perform a separate communication related function.

If the voltage level of the rectified voltage $V_{rec}$ is further increased and the voltage level of the rectified voltage $V_{rec}$ belongs to the fourth forward voltage level (Vf4≤$V_{rec}$≤Vrec max), the transmission controlling unit 160 according to the present invention initiates an operation to perform the optical communication. More specifically, since the voltage level of the rectified voltage $V_{rec}$ is increased over the threshold voltage level $V_{TH}$ which is set to perform the optical communication, the transmission controlling unit 160 is operated to read out data to be transmitted and generate the LED driving signal capable of controlling the turn-on of the plurality of LED groups 200 based on the read data. Since a signal having a fixed value of a direct current form is output as the LED driving signal output from the LED driving controlling unit 130 in a case in which the optical communication is not performed, while the plurality of LED groups 200 are turned on or off depending on the data to be transmitted in a case in which the optical communication is performed, the LED driving signal supplied to the plurality of LED groups 200 upon performing the optical communication has a pulse shape so as to turn on or off the LED groups in a coverage section (i.e., a section in which the voltage level of the rectified voltage $V_{rec}$ is the threshold voltage level $V_{TH}$ or more). Therefore, the transmission controlling unit 160 modulates the LED driving signal of the direct current form based on the data to be transmitted to generate a modulated pulse signal, and is operated to provide the modulated pulse signal to the LED driving controlling unit 130 as the LED driving signal. Meanwhile, the LED driving controlling unit 130 receives the modulated pulse signal output from the transmission controlling unit 160 and controls the plurality of LED group driving units 141 to 144 so that the modulated pulse signal may be provided to all of the four LED groups 201 to 204 as the LED driving signal.

The transmission controlling unit 160 may include a rectified voltage determining means 162, the transmission controlling means 164, and a data memory means 166 as shown in FIGS. 1 and 2, in order to perform the function as described above.

The rectified voltage determining means 162 performs a function of determining the voltage level of the rectified voltage $V_{rec}$ input from the rectifying unit 120. Meanwhile, the drawings are shown based on the exemplary embodiment in which the transmission controlling unit 160 according to the present invention includes the rectified voltage determining means 162 which is separately independent, but since the LED driving controlling unit 130 is also configured to substantially determine the voltage level of the rectified voltage, the transmission controlling unit 160 may also be configured to receive voltage level information of the determined rectified voltage from the LED driving controlling unit 130 without including the separate rectified voltage determining means 162.

The data memory means 166, which is a storage means in which data to be transmitted through the optical communication is stored, may be implemented using various data storage elements. More preferably, the data memory means 166 according to the present invention may be configured to be connected to an external device through a data input/output port 170 to store data input from the external device and output the stored data to the external device. In addition, the data memory means 166 according to the present invention may store data generated in the optical communication device as well as the data input from the external device, and may alternatively store data received using various types of wireless communication including the optical communication.

The transmission controlling means 164 compares the voltage level of the rectified voltage $V_{rec}$ determined by the rectified voltage determining means 162 with the threshold voltage level $V_{TH}$, and enters an optical communication transmission mode in a case in which it is determined that the voltage level of the rectified voltage $V_{rec}$ is increased to the threshold voltage level $V_{TH}$ or more. In the optical communication transmission mode, the transmission controlling means 164 is operated to read out data to be transmitted from the data memory means 166 and modulate the LED driving signal of the direct current form based on the read data to generate a modulated pulse signal. In this case, more preferably, in a case in which it is determined that the voltage level of the rectified voltage $V_{rec}$ is increased, the transmission controlling means 164 according to the present invention may also be configured to perform the optical communication by entering the optical communication transmission mode before the voltage level of the rectified voltage $V_{rec}$ reaches the threshold voltage level $V_{TH}$ (e.g., 90% of the threshold voltage level $V_{TH}$) to generate a modulated pulse signal in advance based on the data to be transmitted, and by providing the modulated pulse signal to the LED group 200 as the LED driving signal at a timing in which the voltage level of the rectified voltage $V_{rec}$ is increased to the threshold voltage level $V_{TH}$ or more. In addition, in a case in which the voltage level of the rectified voltage $V_{rec}$ is decreased below the threshold voltage level $V_{TH}$, the transmission controlling means 164 is configured to terminate the optical communication transmission mode.

Meanwhile, according the configuration of the exemplary embodiment, the transmission controlling means 164 according to the present invention may also be configured to read out the data to be transmitted to be output to the LED driving controlling unit 130, generate the modulated pulse signal based on the data to be transmitted from the LED driving controlling unit 130, and output the generated modulated pulse signal as the LED driving signal.

The following Table 1 illustrates operation states of the LED group driving units 141 to 144 during one period (a half period of the alternating current voltage VAC) of the rectified voltage $V_{rec}$, in the exemplary embodiment in which the first LED group 201 to the fourth LED group 204 are sequentially turned on as the voltage level of the rectified voltage $V_{rec}$ is increased, the fourth LED group 204 to the first LED group 201 are sequentially turned off as the voltage level of the rectified voltage $V_{rec}$ is decreased, and the threshold voltage level $V_{TH}$ for performing the optical communication is configured as the fourth forward voltage level Vf4.

TABLE 1

| $V_{rec}$ | First LED Group Driving Unit | Second LED Group Driving Unit | Third LED Group Driving Unit | Fourth LED Group Driving Unit | States of LED Groups | Optical Communication |
|---|---|---|---|---|---|---|
| Vf1 ≤ $V_{rec}$ < Vf2 | ON | OFF | OFF | OFF | Drive First LED Group | X |
| Vf2 ≤ $V_{rec}$ < Vf3 | OFF | ON | OFF | OFF | Drive First and Second LED Groups | X |
| Vf3 ≤ $V_{rec}$ < Vf4 | OFF | OFF | ON | OFF | Drive First, Second, and Third LED Groups | X |
| Vf4 ≤ $V_{rec}$ ≤ Vrec max | OFF | OFF | OFF | ON | Drive First to Fourth LED Groups | ○ |
| Vf3 ≤ $V_{rec}$ < Vf4 | OFF | OFF | ON | OFF | Drive First, Second, and Third LED Groups | X |
| Vf2 ≤ $V_{rec}$ < Vf3 | OFF | ON | OFF | OFF | Drive First and Second LED Groups | X |
| Vf1 ≤ $V_{rec}$ < Vf2 | ON | OFF | OFF | OFF | Drive First LED Group | X |

According to an exemplary embodiment of the present invention, the LED group driving units 141 to 144 may be configured to be each operated as a constant current source. As illustrated in Table 1, first, once the rectified voltage $V_{rec}$ begins to be applied, a current begins to flow in the first LED group 201. At a timing t1 in which the magnitude of the rectified voltage $V_{rec}$ becomes the first forward voltage level Vf1 as the magnitude of the rectified voltage $V_{rec}$ is increased, the LED driving controlling unit 130 begins to apply a first driving control signal (e.g., 1V) to the first LED group driving unit 141. In this case, since the driving control signal is not applied to other LED group driving units 142 to 144, other LED group driving units 142 to 144 maintain a turn-off state. As the first LED group driving unit 141 is driven, a preset constant current (e.g., 1 mA) flows through a path (P1 in FIG. 1), thereby turning on the first LED group 201. In succession, at a timing t2 in which the magnitude of the rectified voltage $V_{rec}$ becomes the second forward voltage level Vf2 as the magnitude of the rectified voltage $V_{rec}$ is increased, the LED driving controlling unit 130 turns off the first LED group driving unit 141 and begins to apply a second driving control signal (e.g., 2V) to the second LED group driving unit 142. As the second LED group driving unit 142 is driven, a preset constant current (e.g., 2 mA) flows through a path (P2 in FIG. 1), thereby turning on the first LED group 201 and the second LED group 202. Similarly, at a timing t3 in which the magnitude of the rectified voltage $V_{rec}$ becomes the third forward voltage level Vf3 as the magnitude of the rectified voltage $V_{rec}$ is continuously increased, the LED driving controlling unit 130 turns off the second LED group driving unit 142 and begins to apply a third driving control signal (e.g., 3V) to the third LED group driving unit 143. As the third LED group driving unit 143 is driven, a preset constant current (e.g., 3 mA) flows through a path (P3 in FIG. 1), thereby turning on the first LED group 201, the second LED group 202, and the third LED group 203.

Meanwhile, since the rectified voltage $V_{rec}$ becomes the threshold voltage level $V_{TH}$ or more at the timing t4 in which the magnitude of the rectified voltage $V_{rec}$ becomes the fourth forward voltage level Vf4 due to the magnitude of the rectified voltage $V_{rec}$ which is continuously increased, the transmission controlling unit 160 according to the present invention is operated to perform the optical communication. The transmission controlling means 164 in the transmission controlling unit 160 reads out data to be transmitted at a corresponding optical communication period from the data memory means 166 and modulates the fourth driving control signal (e.g., 4V) of the direct current form based on the read data to generate the modulated pulse signal (the pulse signal having 4V in a case of pulse on and 0V in a case of pulse off), which is output to the LED driving controlling unit 130. The LED driving controlling unit 130 turns off the third LED group driving unit 143 and begins to apply the modulated pulse signal to the fourth LED group driving unit 144. As the modulated pulse signal is applied to the fourth LED group driving unit 144, a preset constant current (e.g., 4 mA) flows through a path (P4 in FIG. 1) according to the pulse signal, such that all the first LED group 201 to the fourth LED group 204 are turned on or off based on the data to be transmitted and the optical communication is performed. Optical communication transmission data is shown in the lowest portion of FIG. 3 and optical outputs of the LED groups 200 which are applied with the pulse signal modulated according to the transmission data as the fourth driving control signal and turned on or off are shown in an upper portion of the lowest portion. As shown in the drawing, it may be seen that the optical output in which the LED groups 200 are turned on or off based on the data to be transmitted during optical coverage sections (a time section of t4 to t5, a time section of t13 to t14) appears.

A control in the case in which the rectified voltage $V_{rec}$ reaches a maximum voltage and is then decreased over time is also performed in a way similar to that described above. At a timing t14 in which the magnitude of the rectified voltage $V_{rec}$ is less than the fourth forward voltage level Vf4 as the magnitude of the rectified voltage $V_{rec}$ is decreased over time, the transmission controlling unit 160 terminates the optical communication transmission mode and the LED driving controlling unit 130 turns off the fourth LED group driving unit 144 and begins to apply the third driving control signal to the third LED group driving unit 143. As the fourth LED group driving unit 144 is turned off and the third LED group driving unit 143 is driven, a preset constant current (e.g., 3 mA) flows through the path P3, thereby turning on the first LED group 201 to the third LED group 203. Similarly, at a timing t15 in which the magnitude of the rectified voltage $V_{rec}$ is less than the third forward voltage level Vf3, the LED driving controlling unit 130 turns off the third LED group driving unit 143 and begins to apply the second driving control signal to the second LED group driving unit 142. As the third LED group driving unit 143 is turned off and the second LED group driving unit 142 is driven, a preset constant current (e.g., 2 mA) flows through the path P2, thereby turning on the first LED group 201 and the second LED group 202. In addition, at a timing t16 in which the magnitude of the rectified voltage $V_{rec}$ is less than the second forward voltage level Vf2, the LED driving controlling unit 130 turns off the second LED group driving unit 142 and begins to apply the first driving control signal to the first LED group driving unit 141. As the second LED group driving unit 142 is turned off and the first LED group driving unit 141 is driven, a preset constant current (e.g., 1 mA) flows through the path P1, thereby turning on only the first LED group 201. That is, the LED driving controlling unit 130 according to the present invention may be configured to control the driving of the plurality of LED groups 201 to 204 regardless of variation in the rectified voltage $V_{rec}$ by limiting amplitude of the current flowing in each LED group for each section when the rectified voltage $V_{rec}$ is applied to turn on the plurality of LED groups 201 to 204. Hereinabove, although the description has been made based on the exemplary embodiment in which the value of the constant current flowing in the LED groups 201 to 204 is changed depending on the voltage level of the rectified voltage $V_{rec}$, the value of the constant current flowing in the LED groups 201 to 204 may also be always constantly maintained regardless of the voltage level of the rectified voltage $V_{rec}$ in another exemplary embodiment. Of course, even in the above-mentioned exemplary embodiment, the configuration and function of the transmission controlling unit 160 are the same as those described above.

Meanwhile, according to another exemplary embodiment of the present invention, the LED group driving units 141 to 144 may also be configured to simply perform only a switching operation. In the above-mentioned exemplary embodiment, the LED driving controlling unit 130 is configured to control the driving of the LED groups 201 to 204 by controlling the turn-on and the turn-off of the LED group driving units 141 to 144 depending on the magnitude of the rectified voltage $V_{rec}$ so as to form one of the current paths P1 to P4, in a way similar to that of the exemplary embodiment described above. Of course, in the exemplary embodiment described above, the current flowing in the LED groups 201 to 204 may maintain the preset value by connecting a constant current controlling unit (not shown) between the current paths and a ground. Of course, even in the above-mentioned exemplary embodiment, the configuration and function of the transmission controlling unit 160 are the same as those described above.

Hereinabove, although the exemplary embodiment controlling the driving of the plurality of LED groups 201 to 204 depending on the magnitude of the rectified voltage $V_{rec}$ based on the constant current controlling mode has been described, the present invention is not limited thereto, and various known LED driving controlling modes such as a constant voltage controlling mode, a constant power controlling mode, and the like may be used in the present invention.

More preferably, the LED driving unit 130 according to the present invention may be configured to further support a dimming function. As shown in FIGS. 1 and 2, a dimming signal from the outside generated by a manipulation of a user, or the like is input to the LED driving controlling unit 130 through a dimming signal inputting unit DIM (a terminal no. 6 DIM of the AC LED driving and optical communication control module 100). The LED driving controlling unit 130 is configured to perform a dimming control by adjusting the value of the current flowing in the LED groups 201 to 204 depending on the input dimming signal. The above-mentioned dimming control may be performed using a continuous analog type of dimming control or a step type of dimming control. In the case of the analog type of dimming control, the dimming signal having a value between 0V and 10V, for example, is input through the terminal no. 6 DIM, and the LED driving controlling unit 130 may be configured to adjust the value of current flowing in the LED groups 201 to 204 in proportion to the input dimming signal. On the other hand, in the case of the step type of dimming control, a plurality of dimming levels (e.g., a dimming level 1, a dimming level 2, a dimming level 3, etc) and current values according to the dimming levels are preset, and the dimming signal has a value for indicating a specific dimming level. In this case, the LED driving controlling unit 130 may be configured to determine the specific dimming level corresponding to the input dimming signal and perform the dimming control by performing a control so as to allow the current having a preset value to flow in the LED groups 201 to 204 according to the determined dimming level. In addition, in a case in which an optical communication receiver 300 described below with reference to FIGS. 4 and 5 is included in the optical communication device according to the present invention as a receiving module, the optical communication device according to the present invention may also be configured to receive the dimming signal transmitted from an external device through the optical communication and perform the dimming control based on the received dimming signal.

Configuration and Function of Optical Communication Receiver

FIG. 4 is a configuration block diagram of an optical communication receiver according to an exemplary embodiment of the present invention and FIG. 5 is a timing diagram illustrating a process of the optical communication receiver according to an exemplary embodiment of the present invention. Hereinafter, a configuration and function of an optical communication receiver 300 according to an exemplary embodiment of the present invention will be described in detail with reference to FIGS. 4 and 5.

The optical communication receiver 300 according to the present invention may also be included in the optical communication device as described above as the receiving module, and may be alternatively connected to a separate lighting device and an IT device to perform functions of receiving data transmitted from the optical communication device and outputting the received data to the connected lighting device, or the like. In order to perform the above-mentioned functions, as shown in FIG. 4, the optical communication receiver 300 according to the present invention may include a light receiving unit 310, a decoder 320, a receiving controlling unit 330, an interface unit 340, data memory input and output ports D0 and D1, digital data output ports Y0 and Y1, and an analog data output port Y2.

The light receiving unit 310 performs functions of receiving light output from the optical communication device as described above, converting the received light into an electrical signal, and outputting the electrical signal. As the above-mentioned light receiving unit 310, an element such as a photo diode, or the like and a circuit for the element may be used. The decoder 320 is configured to perform functions of decoding the electrical signal output from the light receiving unit 310 and outputting the decoded signal to the receiving controlling unit 330.

The receiving controlling unit 330 includes a data memory for storing a table, or the like for interpreting the received data, and is configured to interpret the decoded signal output from the decoder 320 and output a signal corresponding to interpreted information to the interface unit 340. In addition, the receiving controlling unit 330 is configured to be connected to the data memory input and output ports D0 and D1 to output data stored in the data memory to the external device through the data memory input and output ports D0 and D1 and store data input from the external device in the data memory.

The interface unit 340 performs a function of outputting the signal output from the receiving controlling unit 330 to the connected external device. More preferably, the interface unit 340 according to the present invention may be configured to output the received optical communication data in an analog data or digital data format. Referring to FIG. 5, a waveform of the rectified voltage $V_{rec}$ according to a change in time is shown in the uppermost portion of FIG. 5 for reference, optical communication receiving data received by the optical communication receiver 300 is shown below the waveform of the rectified voltage $V_{rec}$, a digital signal output from the optical communication receiver 300 in a digital signal output mode (Mode 1) is shown below the optical communication receiving data, and an analog signal output from the optical communication receiver 300 in an analog signal output mode (Mode 2) is shown below the digital signal. The digital signal output mode (Mode 1) is to communicate with the digital device using the digital data such as the IT device, or the like, and the analog signal output mode (Mode 2) is to communicate with the analog device by outputting a predetermined analog signal according to the received data. Particularly, the analog signal output mode (Mode 2) may directly control a connected target device by outputting the analog signal in an analog voltage form. For example, in a case in which the optical communication receiver 300 according to the present invention is connected to the lighting device, the optical communication receiver 300 may also perform the dimming control of the lighting device by providing a dimming signal of an analog voltage form (e.g., a dimming signal of 0 to 10V) in the analog signal output mode (Mode 2) to the lighting device. A setting of the digital signal output mode (Mode 1) or the analog signal output mode (Mode 2) may be implemented through a separate jumper setting provided in the optical communication receiver 300 or may also be configured to automatically select and output the output mode according to the signal received from the receiving controlling unit 330.

Meanwhile, depending on the configuration of the exemplary embodiment, in a case in which the optical communication receiver 300 according to the present invention uses the same AC power as the optical communication device described above, the optical communication receiver 300 according to the present invention may be configured to rectify the AC power and then determine a receive section according to the voltage level of the rectified voltage $V_{rec}$. That is, the optical communication receiver 300 may be configured to determine an optical coverage section of the optical communication device according to the voltage level of the rectified voltage $V_{rec}$ and treat only the data received in the optical coverage interval as effective data. In this case, the receive section may be set to an interval in which the voltage level of the rectified voltage $V_{rec}$ is 90% or more of the threshold voltage level $V_{TH}$, for example, in consideration of error which may occur.

Example of Driving Process of Optical Communication Device

FIG. 6 is a flow chart illustrating an optical communication transmission process performed in the optical communication device using AC LED lighting according to an exemplary embodiment of the present invention. Hereinafter, an operation of the optical communication device according to the present invention will be described with reference to FIG. 6.

The optical communication device according to the present invention first generates a rectified voltage $V_{rec}$ by rectifying an applied AC voltage (S600) and determines magnitude of the generated rectified voltage $V_{rec}$ at the same time (S602).

The optical communication device compares the determined voltage level of the rectified voltage $V_{rec}$ and a threshold voltage level $V_{TH}$ with each other (S604), and in a case in which the voltage level of the rectified voltage $V_{rec}$ is increased to the threshold voltage level $V_{TH}$ or more, the optical communication device enters an optical communication transmission mode, reads out data to be transmitted, and then generates a modulated pulse signal based on the read data. In this case, as described above, in the case in which the voltage level of the rectified voltage $V_{rec}$ is less than the threshold voltage level $V_{TH}$ (e.g., 90% of the threshold voltage level $V_{TH}$, or the like), the optical communication device may also be configured to enter the optical communication transmission mode in advance. The optical communication device initiates an optical transmission of data by controlling the turn on or off of the plurality of LED groups 200 using the generated pulse signal (S608).

The voltage level of the rectified voltage $V_{rec}$ is continuously determined (S610), and in a case in which the voltage level of the rectified voltage $V_{rec}$ is decreased below the threshold voltage level $V_{TH}$ over time, the optical communication device terminates the optical communication transmission mode and stops the transmission of the optical communication data (S612).

The invention claimed is:

1. An optical communication device, comprising:
a plurality of light emitting diode (LED) groups that turn on and turn off according to a control of a lighting and communication control module,
wherein the lighting and communication control module is configured to:
receive an alternating current (AC) input voltage,
generate a rectified voltage from the AC input voltage,
determine a voltage level of the rectified voltage,
sequentially drive the plurality of LED groups by sequentially turning on and turning off the plurality of LED groups based on the voltage level of the rectified voltage, and
perform optical communication through the plurality of LED groups only when the voltage level of the rectified voltage is greater than or equal to a preset threshold voltage level, and wherein the lighting and communication control module comprises:
a signal inputting unit configured to receive the AC input voltage,
a rectifying unit configured to rectify the AC input voltage to generate the rectified voltage,
a plurality of LED group driving units configured to receive the rectified voltage to provide an individual LED driving signal to each of the plurality of LED groups,
an LED driving controlling unit configured to control the LED group driving units by:
determining a magnitude of the LED driving signal based on a magnitude of the rectified voltage, and
providing the magnitude of the LED driving signal, a provision timing of the LED driving signal, and a blocking timing of the LED driving signal to the plurality of LED groups, and
a plurality of LED driving signal outputting units individually configured to provide the LED driving signal of the LED group driving unit to each of the LED groups.

2. The optical communication device of claim 1, wherein the lighting and communication control module further comprises:
a transmission controlling unit configured to receive the rectified voltage to determine the magnitude of a voltage level of the rectified voltage and configured to control the plurality of LED groups to turn on when the voltage level of the rectified voltage is greater than or equal to the preset threshold voltage level.

3. The optical communication device of claim 2, wherein the threshold voltage level is a forward voltage level at which more than half of the plurality of LED groups are turned on.

4. The optical communication device of claim 2, wherein the threshold voltage level is a forward voltage level at which more than ⅔ of the plurality of LED groups are turned on.

5. The optical communication device of claim 2, wherein the threshold voltage level is a forward voltage level at which all the plurality of LED groups are turned on.

6. The optical communication device of claim 2, wherein the transmission controlling unit comprises:
a data memory means configured to store data,
wherein the optical communication device using the AC LED lighting further comprises data input and output ports connected to an external device, and
wherein the transmission controlling unit is configured to:
read out the data stored in the data memory means,
output the read data to the external device, and
input data from the external device to the data memory means.

7. The optical communication device of claim 2, wherein the transmission controlling unit comprises:
a rectified voltage determining means configured to receive the rectified voltage and determine a voltage level of the received rectified voltage;
a data memory means configured to store data; and
a transmission controlling means configured to transmit the stored data by:
comparing the voltage level of the rectified voltage determined by the rectified voltage determining means with the threshold voltage level, reading out data to be transmitted from the data memory means when the voltage level of the rectified voltage is greater than or equal to the threshold voltage level, and controlling the plurality of LED groups based on the read data to turn on.

8. The optical communication device of claim 7, wherein the transmission controlling means is configured to modulate the LED driving signal based on the read data to generate a modulated pulse signal, and wherein the LED driving controlling unit is configured to control a driving of the plurality of LED groups based on the modulated pulse signal.

9. An optical communication method using alternating current (AC) light emitting diode (LED) lighting, the optical communication method comprising:

receiving an AC input voltage to generate a rectified voltage;

determining a voltage level of the rectified voltage;

sequentially driving a plurality of LED groups by sequentially turning on and turning off the plurality of LED groups based on the determined voltage level of the rectified voltage;

comparing the determined voltage level of the rectified voltage with a preset threshold voltage level;

permitting optical communication through the plurality of LED groups only when the voltage level of the rectified voltage is greater than or equal to the preset threshold voltage level; and terminating the optical communication when the voltage level of the rectified voltage is decreased below the threshold voltage level; and initiating the optical communication by controlling the plurality of LED groups to turn on only when the voltage level of the rectified voltage is increased to a voltage level greater than or equal to the threshold voltage level.

10. The optical communication method of claim 9, wherein the threshold voltage level is a forward voltage level at which more than half of the plurality of LED groups are turned on.

11. The optical communication method of claim 9, wherein the threshold voltage level is a forward voltage level at which more than ⅔ of the plurality of LED groups are turned on.

12. The optical communication method of claim 9, wherein the threshold voltage level is a forward voltage level at which all the plurality of LED groups are turned on.

13. The optical communication method of claim 9, further comprising:

determining whether the voltage level of the rectified voltage is increased to a voltage level greater than or equal to the threshold voltage level by comparing the determined voltage level of the rectified voltage with the preset threshold voltage level;

determining whether the voltage level of the rectified voltage is decreased below the threshold level by comparing the determined voltage level of the rectified voltage with the preset threshold voltage level;

initiating the optical communication by controlling the plurality of LED groups to turn on only when the determined voltage level of the rectified voltage is increased to a voltage level greater than or equal to the threshold voltage level; and terminating the optical communication only when the determined voltage level of the rectified voltage is decreased below the threshold voltage level.

14. The optical communication method of claim 13, wherein initiating the optical communication comprises:

reading out-data to be transmitted from a data memory; and controlling the plurality of LED groups to turn on based on the read data.

15. The optical communication method of claim 14, wherein initiating the optical communication further comprises:

modulating an LED driving signal based on the read data to generate a modulated pulse signal; and controlling a driving of the plurality of LED groups based on the modulated pulse signal.

* * * * *